United States Patent [19]

Haraguchi et al.

[11] Patent Number: 5,450,139
[45] Date of Patent: Sep. 12, 1995

[54] APPARATUS FOR TRANSMITTING VIDEO SIGNALS COMPRISING A MEMORY BACKUP DEVICE

[75] Inventors: Hideo Haraguchi; Kaichi Tatsuzawa; Hiroyuki Yamauchi, all of Kanagawa, Japan

[73] Assignee: Sony Corporation, Tokyo, Japan

[21] Appl. No.: 168,230

[22] Filed: Dec. 17, 1993

[30] Foreign Application Priority Data

Dec. 28, 1992 [JP] Japan .................. 4-360121

[51] Int. Cl.[6] .............................................. H04N 5/268
[52] U.S. Cl. .................................. 348/705; 348/714
[58] Field of Search ............... 348/705, 708, 724, 723, 348/466, 714, 715, 718; 371/7, 8.1, 8.2, 10.1, 11.2; H04N 5/268, 5/38

[56] References Cited

U.S. PATENT DOCUMENTS

| | | | |
|---|---|---|---|
| 4,686,675 | 8/1987 | Morimoto et al. | 371/8.2 |
| 4,775,976 | 10/1988 | Yokoyama | 371/8.2 |
| 5,081,619 | 1/1992 | Nagata | 371/8.2 |
| 5,287,186 | 2/1994 | Takamori | 348/705 |
| 5,371,882 | 12/1994 | Ludlam | 371/8.1 |

*Primary Examiner*—James J. Groody
*Assistant Examiner*—Chris Grant
*Attorney, Agent, or Firm*—William S. Frommer; Alvin Sinderbrand

[57] ABSTRACT

Apparatus for transmitting video signals includes a primary storage device having a plurality of storage units for storing and reading video signals selectively supplied thereto by a coupling circuit. An alternate storage device functions as a backup and receives and stores all of the video signals that are supplied to the primary storage device; and reads out therefrom the video signals which are in the process of being read from the primary storage device in the event a failure is detected in the primary storage device.

14 Claims, 4 Drawing Sheets

APPARATUS FOR TRANSMITTING VIDEO SIGNALS COMPRISING A MEMORY BACKUP DEVICE

BACKGROUND OF THE INVENTION

The present invention relates to video transmission apparatus and, more particularly, to apparatus for transmitting a plurality of video signals or audio signals, such as commercial messages (CMs), for broadcasting purposes.

It is known to transmit video or audio commercial messages for broadcasting purposes by utilizing a "cart" machine. The cart machine is an automatic cassette or disk changing and reproduction device which reproduces multiple recording media without manual loading of cassettes or disks. It also is known to record commercial messages on a cassette or disk in advance such that commercial messages previously recorded on several recording media can be reproduced and transmitted continuously and in a predetermined sequence without the need for human intervention to constantly exchange cassettes or disks.

Another system, shown in FIG. 1, is known to utilize a single backup video tape recorder to prevent periods of "dead air" when failures occur during reproduction or transmission of a commercial message or program. In this system, commercial messages stored on magnetic tapes in VCR 1, VCR 2, etc are copied (i.e. dubbed) onto a magnetic tape in a backup VCR in advance in a predetermined sequence by utilizing a switching circuit. During transmission, VCR 1, VCR 2, etc reproduce commercial messages in the predetermined sequence and at the same time, the backup VCR reproduces the same commercial messages such that should a failure occur in a VCR which is reproducing a commercial message, a switch selects the signal reproduced by the backup VCR, thus preventing periods of "dead air".

One problem encountered with these devices is that they are generally adapted for a single channel of reproduction and transmission and only have limited backup capability to deal with failures that may occur during signal reproduction or transmission.

Another difficulty encountered with the above described systems is their general inability to prevent periods of "dead air" without having only a single VCR reproduce or transmit commercial messages or programs at a time or without making copies of pre-recorded commercial messages or programs in advance when failures occur during reproduction or transmission. In addition, the preventive measure of having parallel systems and duplicate recording media containing the commercial messages generally is impractical due to added cost, size and complexity of such a system.

OBJECTS OF THE INVENTION

Therefore, it is an object of the present invention to provide apparatus for transmitting video signals which overcomes the shortcomings of the above described systems.

Another object of the present invention is to provide apparatus for reproducing and transmitting video signals which contains a backup feature to effectively deal with failures during the reproduction and/or transmission.

An additional object of this invention is to prevent periods of "dead air" when failures occur during reproduction and/or transmission of a commercial message or program.

Still another object of the present invention is to provide apparatus of the aforementioned type whose construction is not unduly complicated or unduly large.

Various other objects, advantages and features of the present invention will become readily apparent to those of ordinary skill in the art, and the novel features will be particularly pointed out in the appended claims.

SUMMARY OF THE INVENTION

In accordance with one embodiment of the present invention, apparatus for transmitting video signals is comprised of a source for supplying video signals (e.g. commercial messages) and a primary storage device (e.g. random access memory) having a plurality of storage units for storing and reproducing video signals supplied from the source. An alternate storage device (e.g. magneto-optical disk device) receives and stores all of the video signals that are coupled to the primary storage device and reproduces one of the video signals stored therein. A selector selects at least one, but may select a plurality, of the video signals reproduced by the primary storage and alternate storage devices which are transmitted (over one or several transmitting channels).

As one aspect of the present invention, the number of storage units in the primary storage device is larger than the number of transmitting channels.

As another aspect of the present invention, video signals from the source are supplied to a different storage unit in the storage device when the original storage unit (to which the video signals were destined) is incapable of storing or reading the source video signals.

As a feature of this aspect, the selector selects the video signals reproduced by the other storage unit when the initially selected storage unit is incapable of storing video signals.

Preferably, the selector selects the video signals read from the alternate storage device (and de-selects the originally selected storage unit in the primary storage device) when the originally selected storage unit is incapable of reading the video signals stored therefrom.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

DETAILED DESCRIPTION OF CERTAIN PREFERRED EMBODIMENTS

Figure 1:
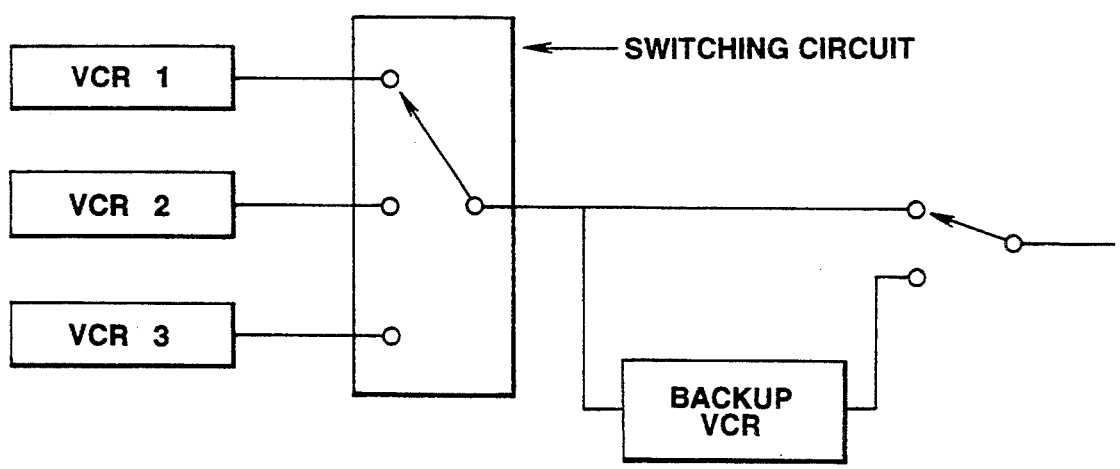
FIG. 1 is a block diagram of a known transmitting apparatus.
Figure 2:
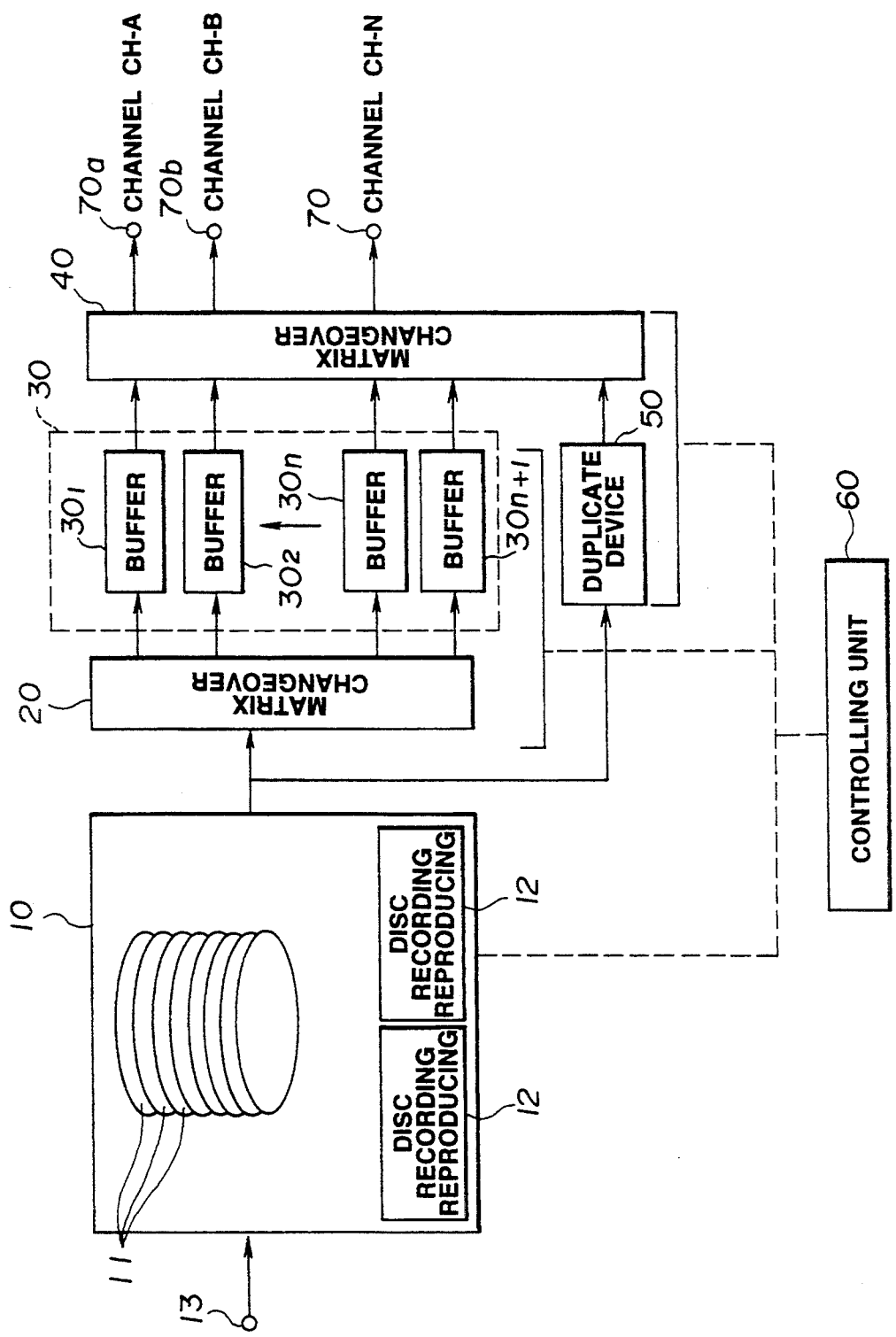
FIG. 2 is a block diagram of one embodiment of apparatus for transmitting video signals in accordance with the present invention.

Referring now to the drawings, FIG. 2 is a block diagram of one embodiment of apparatus for transmitting video signals in accordance with the present invention and is comprised of a disk array section 10, a first matrix changeover section 20, a buffer section 30, a second matrix changeover section 40, a duplicate device 50, a control unit 60 and a plurality of output transmissions on channels 70.

Disk array section 10 functions as a source of video signals for first matrix changeover section 20. In one embodiment of the present invention, disk array section 10 comprises a number of disks 11 and at least one recording and reproducing unit 12. The disk array section receives external video signals supplied by way of input terminal 13, the video signals being recorded on a selected one of the disks 11 by a recording and reproducing unit 12. A magneto-optical disk may be employed for each disk 11 in disk array section 10. Advantageously, disk array section 10 exhibits an automatic disk exchange function for automatically loading and unloading each disk 11 on a recording and reproducing unit 12. Prior to recording, one of the discs 11 is selected and automatically loaded onto one of the recording and reproducing units. After the external video signals are recorded onto disk 11, that disk is automatically removed from the recording and reproducing unit and is returned to an original housing position.

In addition to recording the external video signals, disk array section 10 reproduces selected stored video signals by loading a disk 11 containing those video signals onto recording and reproducing unit 12. The stored video signals are reproduced and supplied to first matrix changeover section 20 and to duplicate device 50. It will be seen that if the disk array section includes more than one recording and reproducing unit, external video signals may be recorded on one disk while at the same time previously recorded video signals may be played back from another disk. In addition, several previously recorded video signals may be played back concurrently from several disks.

First matrix changeover section 20 receives the video signals from disk array section 10 and supplies those video signals to a selected one of the buffers in buffer section 30. Control unit 60 controls first matrix changeover section 20 by indicating which buffer in buffer section 30 is selected. The first matrix changeover section may supply the source video signals to more than one buffer in the buffer section or in the alternative, supply multiple source video signals to respective selected buffers in the buffer section when the disk array section supplies more than one video signal concurrently. In another embodiment of the present invention, first matrix changeover section 20 is not used, where each buffer additionally includes a write enable input which is received from control unit 60 such that video signals supplied from disk array section 10 are supplied to all of the buffers in the buffer section and the buffers selectively store each video signal.

Buffer section 30 contains a plurality of buffers for storing video signals and a plurality of reading means (not shown) for reproducing (or reading out) video signals received from first matrix changeover section 20. Each buffer may be constructed as a random access memory such as a hard disk, a semiconductor memory or the like. These storage devices are relatively inexpensive compared to the magneto-optical disk device, for example, used in disk array section 10. Additional backup buffers, therefore, may be employed without too much additional cost to insure that buffer section 30 is provided with sufficient capacity capable of recording and reproducing video signals. Thus, in a preferred embodiment, the number of buffers in buffer section 30 is greater than the number of transmission channels 70 and the size of each buffer is relatively small, for example, each buffer being capable of storing and reproducing one to two commercial messages, such that replacement cost of a buffer can be minimized.

Each buffer $30_1$ to $30_{n+1}$ in buffer section 30 stores video signals supplied by first matrix changeover section 20 in accordance with control signals provided by control unit 60. Buffers $30_1$ to $30_{n+1}$ subsequently read the stored video signals to second matrix changeover section 40. Each buffer in buffer section 30 may store or read video signals simultaneously with the storage or reproduction of video signals by other buffers in buffer section 30. In one embodiment, the video signals are stored in buffer section 30 in an order such that they are read out to a specified channel in a predetermined sequence of transmission but video signals may also be transmitted on multiple channels as is further described below. To allow for programming changes and the like, it is preferable that buffers $30_1$ to $30_{n+1}$ are random access memories, as described above.

In addition, each buffer is adapted to store a plurality of video signals which comprise, for example, a program package for a predetermined time period, for example, a commercial advertisement. These program packages may be transmitted sequentially or in parallel over channels $70_a$ to $70_n$ as is further described below. As an alternative, the video signals comprising a program package may be stored in several buffers in buffer section 30 and individual buffers are controlled to read out their video signals in a sequence determined by control unit 60. As described below, second matrix changeover section 40 provides these video signals read out from the respective buffers to selected channels $70_a$ to $70_n$.

As described above, the number of buffers $30_1$ to $30_{n+1}$ in the buffer section is larger than the number of transmitting channels $70_a$ to $70_n$. In one embodiment, buffer $30_{n+1}$ operates as an alternate buffer which is supplied with video signals by first matrix changeover section 20 when a failure is detected by any one of the various methods known in the art during recording by one of the other buffers in the buffer section. When that occurs, the first matrix changeover section and the second matrix changeover section both "detach" from the failed buffer and "attach" to the alternate buffer. In this instance, disk array section 10 re-supplies the video signals through first matrix changeover section 20 to the alternate buffer such that the alternate buffer stores the entire video signal which was initially intended to be stored in the buffer that failed. Using alternate buffer $30_{n+1}$ as the "backup" buffer provides trouble-free use of buffer section 30 and disconnecting the failed buffer from the system allows for repair of the failed buffer during continued operation of the transmission device of the present invention.

Second matrix changeover section 40 selects and transmits to output terminals $70_a$ to $70_n$ of channels CH-A to CH-N the video signals read from the buffers in buffer section 30 in response to control signals supplied by control unit 60 and is further described below with reference to FIG. 3. In addition, the second matrix changeover section selects the video signals supplied by duplicate device 50 if a failure occurs as described below.

All of the video signals supplied to first matrix changeover section 20 by disk array section 10 are also supplied to duplicate device 50. Duplicate device 50 preferably is a random access memory, for example, a magneto-optical disk device, which stores these video signals. Duplicate device 50 also contains a reading means and is adapted to read out any of the video signals stored therein. If a failure occurs within one of the buffers in buffer section 30 while the video signals are being read from that buffer, the second matrix changeover section "disconnects" from the failed buffer and selects duplicate device 50 to provide the video signals which are to be transmitted. At this point, duplicate device 50 begins reading the video signal stored therein that was initially being read by the failed buffer in buffer section 30. Normally, buffer $30_{n+1}$ is used as the alternate buffer for a failed buffer, but since the failed buffer failed during read-out, the video signals have not yet been stored in alternate buffer $30_{n+1}$.

Thus, when control unit 60 detects an abnormal read-out state (i.e. failure during read-out) within one of the buffers in buffer section 30, duplicate device 50, Which normally reproduces the video signals then being read out from the buffer selected by second matrix changeover section 40 and now correspond to the video signals being transmitted by the failed buffer, is selected to supply its read-out video signals to the second matrix changeover section. Hence, the proper video signals nevertheless are read out and transmitted over the original channel even though a failure has occurred. Connection to duplicate device 50 therefore allows for trouble-free transmission of video signals without producing any so called "dead air" over the air waves. The delay in the switching process from buffer section 30 to duplicate device 50 by second matrix changeover section 40 causes no problem during transmission for television, cable television, radio or the like.

Figure 3:
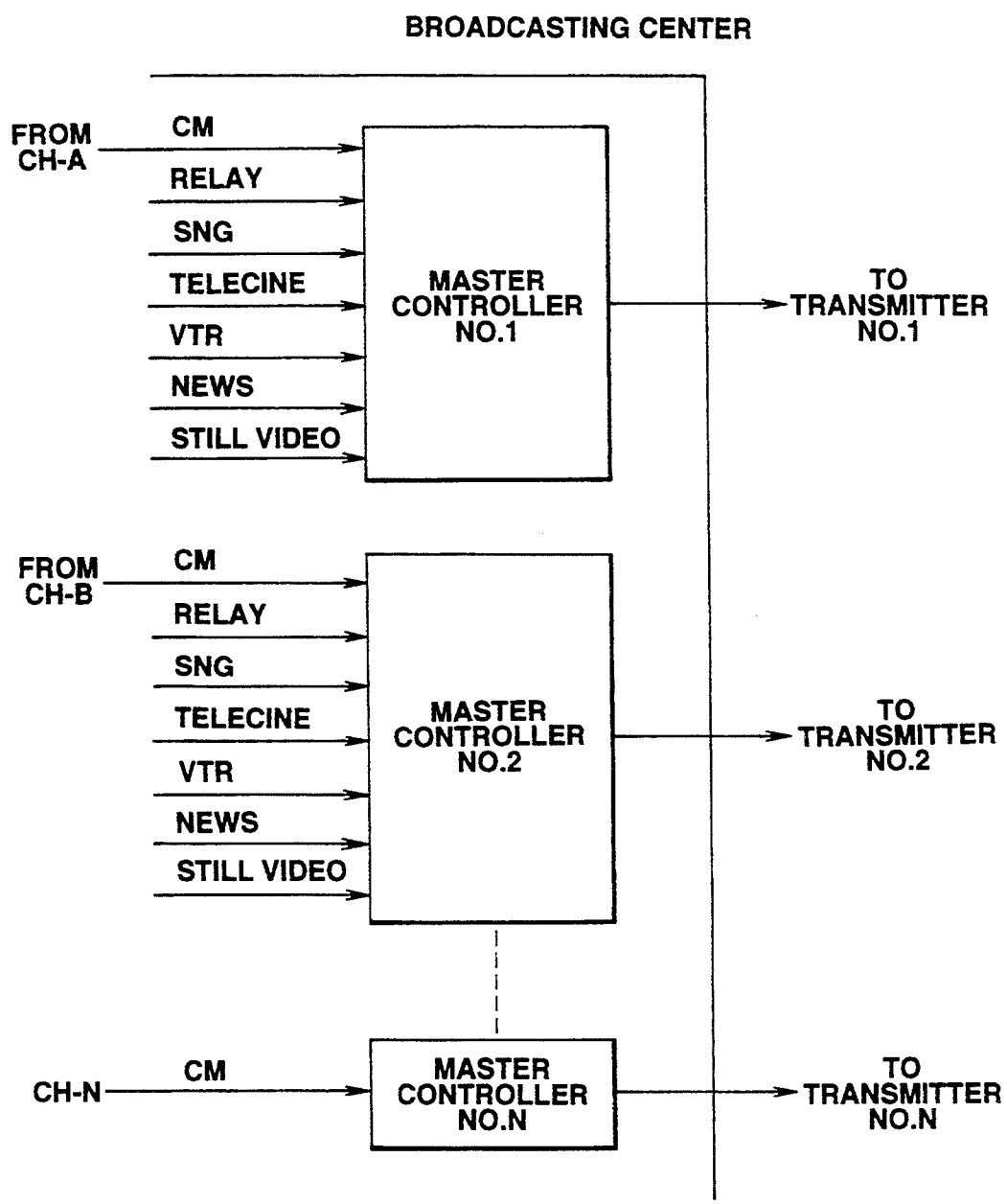
FIG. 3 is a block diagram of a broadcasting center which utilizes the apparatus of the present invention.

FIG. 3 is a block diagram of a broadcasting center which utilizes video signals transmitted on channels CH-A to CH-N of the transmitting device of the present invention and encompasses no part of the present invention. As shown, video signals transmitted on channels CH-A and CH-B to CH-N are supplied to Master Controller No. 1 and No. 2 to No. N, respectively, each master controller selecting one of the received signals to be ultimately transmitted. A master controller receives video signals from various sources such that an entire programming format can be transmitted, the various video signals including television programs supplied by a video tape recorder (VTR), video signals from other broadcasting locations via satellite relay (RELAY, SNG (satellite news)), commercial messages (CM), still video messages (e.g. "please stand by"), movies (TELECINE), etc. Each master controller may transmit different video signals, for example, each master controller represents a different television station. In addition, a master controller may transmit video signals for a specified geographic region such that a plurality of master controllers transmit the same program, movie, etc, but each individual master controller transmits different commercial messages (e.g. a southern region receives different commercials than a northern region, but both receive the same program). For this purpose, it is therefore necessary for the transmitting device of the present invention to be capable of transmitting both the same commercial messages and different commercial messages over the various channels.

Figure 4:
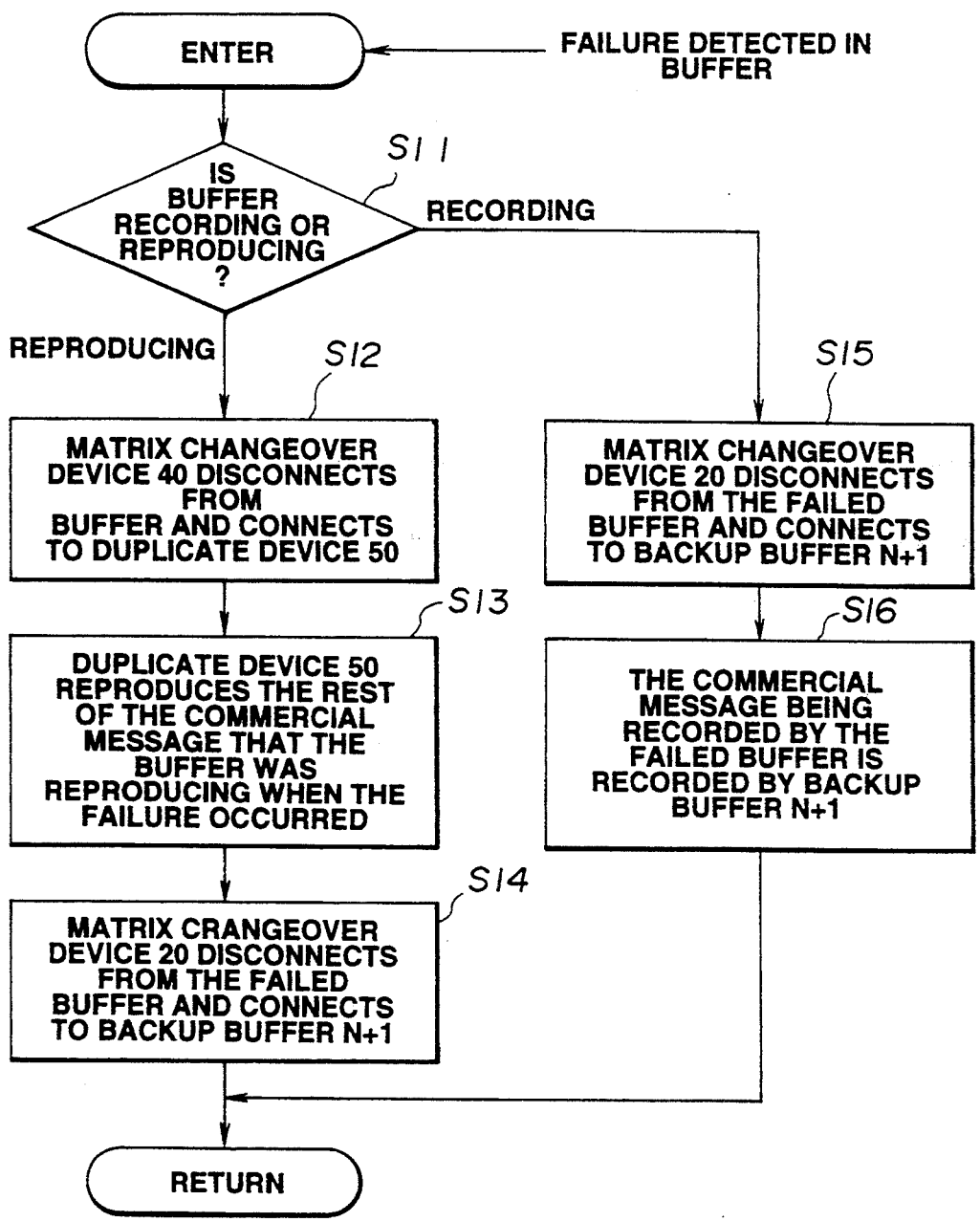
FIG. 4 is a flow chart illustrating the operation when a failure is detected in the apparatus for transmitting video signals according to the present invention.

FIG. 4 is a flow chart illustrating the operation when a failure is detected in the apparatus for transmitting video signals according to the present invention. Operation of this flow chart begins when control unit 60 determines that a failure has occurred in any one of the buffers in buffer section 30 using any one of the various known methods of detecting a failure in a recording/reproduction device and begins at inquiry S11 which determines whether the failed buffer was recording or reproducing video signals. If the buffer was reproducing (reading) stored video signals when the failure was detected, operation proceeds to step S12, but if the buffer was recording video signals when the failure was detected, operation proceeds to step S15.

At step S12, the buffer in buffer section 30 in which the failure is detected is detached from matrix changeover device 40, and duplicate device 50 is "connected" to matrix changeover device 40 as described above. At step S13, those video signals which are the same as the video signals being read out from the failed buffer in buffer section 30 are supplied by duplicate device 50 to second matrix changeover section 40 which are then transmitted on the transmission channel selected by control signals provided by control unit 60. Since the duplicate device is a random access type memory, it can reproduce the desired video signals immediately. Afterwards, matrix changeover device 20 disconnects from the failed buffer and "connects" to buffer $30_{n+1}$ so as to prevent further utilization of the failed buffer. Upon completion of step S14, this subroutine terminates.

At step S15, the buffer in buffer section 30 in which the failure is detected is detached from the system and buffer $30_{n+1}$ is utilized as a backup buffer and is "connected" to the system as described above. Then, at step S16, first matrix changeover section 20 provides the source video signals from disk array section 10 to buffer $30_{n+1}$ which are then recorded by buffer $30_{n+1}$, thereafter, terminating this subroutine.

As described above, the video signal transmission device of the present invention is capable of preventing failed transmissions of video signals by utilizing an alternate buffer in buffer section 30. In addition, duplicate device 50 allows for continuous transmission in the event of a buffer failure during transmission.

While the present invention has been particularly shown and described in conjunction with a preferred embodiment thereof, it will be readily appreciated by those of ordinary skill in the art that various changes may be made without departing from the spirit and scope of the invention. For example, although the above embodiment has been described with reference to video signals, the present invention is not limited to video signals and may transmit other signals such as audio or information signals.

As another example, although the present discussion is directed to television programs and commercials, the present invention is not limited solely to these types of video signals and may be widely applied to the transmission of other video signals.

Therefore, it is intended that the appended claims be interpreted as including the embodiments described herein, the alternatives mentioned above, and all equivalents thereto.

What is claimed is:

1. Apparatus for transmitting video signals comprising:

source means for supplying a plurality of video signals;

storage means having a plurality of storage units for selectively storing said plurality of video signals, respectively, and storage unit reading means for reading the stored video signals from said storage units;

coupling means for receiving said plurality of video signals from the source means and for selectively supplying said plurality of video signals to said storage units of the storage means;

alternate storage means connected with said source means for receiving and storing all of the plurality of video signals supplied by said source means and having an alternate storage reading means for selectively reading the video signals from the alternate storage means;

selection means for selecting at least one of the video signals read from the storage means and the alternate storage means and for transmitting each selected video signal; and control means for controlling the source means, the coupling means, the alternate storage means and the selection means, the control means controlling the coupling means to selectively supply said video signals to a different storage unit in the storage means when the storage unit to which said video signals are initially supplied is incapable of storing video signals.

2. The apparatus of claim 1, wherein the source means re-supplies the video signals to said different storage unit in the storage means that were initially supplied when said coupling means is controlled to selectivity supply said video signals to said different storage unit.

3. The apparatus of claim 1, wherein the control means controls the selection means to select the video signals read from said different storage unit prior to transmitting the selected video signals when the storage unit to which said video signals was initially selectively supplied is incapable of storing video signals.

4. The apparatus of claim 1, wherein each of the plurality of storage units of the storage means is a random access memory.

5. The apparatus of claim 1, wherein the alternate storage means is a magneto-optical disk device.

6. The apparatus of claim 1, wherein the video signals are commercial messages.

7. The apparatus of claim 1, wherein the source means is a reproduction device.

8. The apparatus of claim 1, wherein each storage unit in the storage means is a disk drive device.

9. The apparatus of claim 1, wherein said selection means is operable to select a respective plurality of said video signals read from said plurality of storage units in said storage means and the alternate storage means and transmits said respective plurality of said video signals over a respective plurality of channels.

10. The apparatus of claim 9, wherein a number of storage units in the storage means is larger than a number of said channels.

11. The apparatus of claim 1, wherein said coupling means is operable to selectively supply said plurality of video signals to a respective plurality of said storage units of the storage means.

12. The apparatus of claim 1, wherein said coupling means is operable to supplying said plurality of video signals to all of the storage units in the storage means, and said control means is operable to control the storage means such that each of the storage units in the storage means selectively stores the video signals.

13. Apparatus for transmitting video signals comprising:

source means for supplying a plurality of video signals;

storage means having a plurality of storage units for selectively storing said plurality of video signals, respectively, and storage unit reading means for reading the stored video signals from said storage units;

coupling means for receiving said plurality of video signals from the source means and for selectively supplying said plurality of video signals to said storage units of the storage means;

alternate storage means connected with said source means for receiving and storing all of the plurality of video signals supplied by said source means and having an alternate storage reading means for selectively reading the video signals from the alternate storage means;

selection means for selecting at least one of the video signals read from the storage means and the alternate storage means and for transmitting each selected video signal; and control means controlling the source means, the coupling means, the alternate storage means and the selection means, the control means controlling the selection means to select the video signals read from the alternate storage means when the video signals cannot be read from the selected storage unit and to de-select the selected storage unit from which the video signals cannot be read.

14. Apparatus for transmitting video signals comprising:

source means for supplying a plurality of video signals;

storage means having a plurality of storage units for selectively storing said plurality of video signals, respectively, and storage unit reading means for reading the stored video signals from said storage units;

coupling means for receiving said plurality of video signals from the source means and for selectively supplying said plurality of video signals to said storage units of the storage means;

alternate storage means connected with said source means for receiving and storing all of the plurality of video signals supplied by said source means and having an alternate storage reading means for selectively reading the video signals from the alternate storage means;

selection means for selecting at least one of the video signals read from the storage means and the alternate storage means and for transmitting each selected video signal; and control means for controlling the source means, the coupling means, the alternate storage means and the selection means, the control means controlling the selection means to select the video signals read from the alternate storage means when the video signals cannot be read from the selected storage unit, the control means controlling the coupling means to selectively supply said video signals to a different storage unit in the storage means when the video signals cannot be read from the storage unit to which said video signals are initially supplied.

* * * * *